March 8, 1966      H. A. WENGER      3,239,137
METHOD OF DISCHARGING SLUDGE FROM SELF-OPENING CENTRIFUGES
Filed May 16, 1963
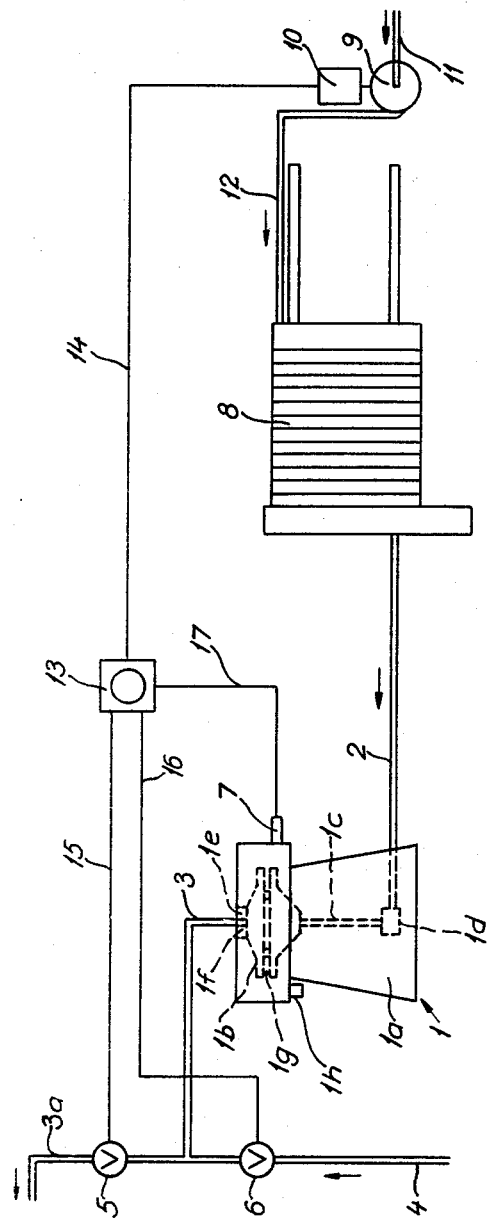
INVENTOR.
Henry Arthur Wenger
BY
Davis, Hoxie, Faithfull & Hapgood
Attorneys

United States Patent Office 3,239,137
Patented Mar. 8, 1966

3,239,137
METHOD OF DISCHARGING SLUDGE FROM SELF-OPENING CENTRIFUGES
Henry Arthur Wenger, Zurich, Switzerland, assignor to Aktiebolaget Separator, Stockholm, Sweden, a corporation of Sweden
Filed May 16, 1963, Ser. No. 280,926
Claims priority, application Sweden, July 19, 1962, 8,035/62
5 Claims. (Cl. 233—20)

This invention relates to the operation of centrifugal separators of the self-opening type for intermittently discharging separated sludge, and more particularly to an improved method of effecting the sludge discharge.

When separating solid particles in the form of sludge from valuable liquids, as in the food industry, self-opening centrifugal separators are generally used. These separators are provided with electrically or hydraulically operated devices which, at preset time intervals, open and close slits in the peripheral wall of the rotor, so that the separated sludge is instantly ejected through the open slits due to the action of the centrifugal force. However, during this process a great part of the separated liquid contained in the rotor is ejected and discharged together with the sludge which entails considerable losses of separated liquid. These losses of liquid will, of course, be greater with shorter time intervals between the sludge discharges, that is, with higher concentration of sludge in the unseparated liquid.

In order to avoid these losses, it has been the practice to displace, prior to each sludge discharge, the separated liquid contained in the rotor by means of another liquid (usually clear water) which is fed into the rotor through its inlet, the feed of unseparated liquid to the rotor being interrupted during this displacement and the subsequent sludge discharge. The separated liquid is then, indeed displaced from the rotor and discharged through its liquid outlet, but as soon as the displacing liquid is introduced into the rotor there occurs a considerable muddying of the displaced liquid as well as of the displacing liquid by previously separated sludge which is loosened from the sludge space in the rotor and which is to be ejected next. The sludge thus loosened does not have time to be separated once more and it is led out through the outlet pipe together with the displaced separated liquid, so that the result of the separation is spoiled to a great extent.

The present invention eliminates the above-mentioned disadvantages and makes it possible to obtain an entirely sludge-free separated liquid without any losses or with very insignificant losses of the often extremely valuable liquid.

According to the invention, the sludge-containing feed liquid is fed into the rotor through its inlet while the rotor is driven at normal speed for centrifugally separating sludge from the feed liquid and while discharging separated liquid from the rotor through its liquid outlet. At the same time, the peripheral sludge outlet of the rotor is kept closed to provide in the rotor a peripheral accumulation of separated sludge and an inner body of separated liquid. Before discharging the accumulated sludge, a second lquid is introduced into the rotor in the direction from the liquid outlet to the feed inlet so as to displace separated liquid from the inner body thereof, while continuing to drive the rotor at normal separating speed. Then, the peripheral sludge outlet of the rotor is opened to discharge sludge from the peripheral accumulation while continuing this driving of the rotor. The sludge outlet is then closed and the various steps are repeated.

The supply of unseparated feed liquid to the rotor is preferably interrupted immediately before the displacement of the separated liquid starts, and it is resumed only after the sludge outlet has again been closed upon discharge of the sludge.

The inlet pipe for unseparated feed liquid should be kept open during the displacement of separated liquid so that the displaced liquid and a part of the displacing liquid can be led from the rotor through its inlet.

The displacing liquid is preferably fed into the rotor through a branch pipe mounted on its discharge pipe leading from the separated liquid outlet. Thus, the other branch, which constitutes the discharge pipe proper for separated liquid, is kept closed during feeding of the displacing or second liquid.

The invention is described more in detail below, reference being made to the accompanying drawing which illustrates schematically a system for practicing the new method.

In the drawing, reference numeral 1 designates a centrifuge with a rotor of the self-opening type previously mentioned. While it may be of any conventional construction, it is here illustrated as being of the so-called hermetic construction such as is commonly used for separation of cooled wort in the production of beer. More particularly, the centrifuge as shown comprises a frame or housing 1a in which the rotor 1b is mounted and driven on a vertical axis. The rotor has a hollow drive shaft 1c which also serves as the feed inlet to the rotor, the feed being delivered to the lower end of this shaft by way of the usual stationary sub-housing 1d. The separated liquid is discharged from the rotor through an outlet formed by an axial tube 1e hermetically sealed in a stationary packing assembly 1f. The separated sludge, being heavier than the liquid, accumulates at the periphery of rotor 1b and is intermittently discharged by opening and then closing the usual peripheral sludge outlets 1g of the rotor. The intermittently discharged sludge is led away through outlet 1h from the stationary cover or collecting vessel of the frame.

Since centrifuges of the type described and schematically illustrated are well known in the art, further description and illustration are unnecessary. However, as an example of further details, reference may be had to U.S. Patent No. 2,502,945, dated April 4, 1950. As illustrated, the opening and closing of sludge outlets 1g are effected by electromagnetic valve means 7 in a manner well known in the art. Alternatively, these sludge outlets may be opened and closed hydraulically by conventional means as disclosed, for example, in U.S. Patent No. 2,178,547, dated November 7, 1939, and British Patent No. 662,451, published December 5, 1951.

From a feed pipe 11 to the system, sludge-containing wort is pumped by a centrifugal pump 9, driven by an electric motor 10, through a delivery pipe 12, and in the present example, through a heat exchanger 8 in order to be cooled. From heat exchanger 8, the wort is pumped through a feed pipe 2 to the inlet sub-housing 1d of self-opening separator 1. The separated, sludge-free wort leaving the rotor from its hermetically sealed outlet 1e enters a stationary outlet pipe 3 and is discharged by means of an electrically actuated shut-off valve 5 which is kept open during the separation process. After the separation has been carried on for a certain period of time, the quantity of separated sludge is such that the rotor has to be opened for discharging the sludge through peripheral outlets 1g, which is brought about in the known manner by means of the electromagnetic valves 7 which control the opening and the closing, respectively, of these peripheral sludge outlets.

Prior to each discharge of sludge, the displacement of the separated liquid from rotor 1b is effected as follows: The electric motor 10 and thus the centrifugal pump 9 are stopped so that the supply of unseparated liquid through the pipeline 12, 8 and 2 is interrupted without the pipeline being shut off. Thereafter, the valve 5 on the discharge pipe 3 for separated liquid is closed, a shut-off valve 6 on a branch pipe 4 connected to the discharge pipe 3 proper is opened, and the liquid (usually clear water) which is to displace the separated liquid is delivered via the pipeline 4, 6 and 3 through the separator, from its separated liquid outlet 1e to its inlet 1c, and therefrom into the pipeline 2, 8 and 12 to a desired distance from the separator 1.

Valve 6 is then closed and, owing to the action of the electromagnetic valve means 7, the rotor is opened at its peripheral sludge outlet 1g so that the discharge of sludge is carried out instantly, the displacing liquid contained in the rotor 1b and in the pipeline 2, 8 and 12 being ejected together with the sludge. The rotor is then closed at sludge outlet 1g by the action of the electromagnetic valve means 7, after which the valve 5 is opened and the pump motor 10 is started so that unseparated liquid is again fed into the separator 1 and separated liquid is obtained through outlet 1e and discharge pipe 3, thus completing a working cycle.

In the drawing, reference numeral 13 designates a timer of a type known in the art, which, by means of electric impulses via a line 14, starts and stops the pump motor 10, via a line 15 opens and closes the valve 5, via a line 16 opens and closes the valve 6, and via a line 17 actuates the electromagnetic valve means 7 for the opening and closing of the rotor at its sludge outlet 1g.

I claim:
1. In the operation of a centrifugal separator of the self-opening type including a rotor having an inlet for sludge-containing feed liquid, a separated liquid outlet, and a peripheral sludge outlet adapted to be alternately opened and closed, the method which comprises the steps of feeding the feed liquid into the rotor through said inlet while driving the rotor at normal speed for centrifugally separating sludge from said feed liquid and while discharging separated liquid from the rotor through said liquid outlet, maintaining said sludge outlet closed during said feeding to provide in the rotor a peripheral accumulation of separated sludge and an inner body of separated liquid, then introducing a second liquid into the rotor in the direction from said liquid outlet to said inlet to displace separated liquid from said body while continuing said driving of the rotor, then opening said sludge outlet to discharge sludge from said peripheral accumulation while continuing said driving of the rotor, and then closing the sludge outlet.

2. The method according to claim 1, comprising also the steps of interrupting said feeding of the feed liquid immediately before said displacement of separated liquid by the second liquid, and resuming said feeding only after said closing of the sludge outlet.

3. The method according to claim 1, comprising also interrupting said feeding of the feed liquid to said inlet immediately before said displacement of separated liquid by the second liquid, the displaced liquid and part of the second liquid being passed from the rotor through said inlet.

4. The method according to claim 1, in which the second liquid is introduced into the rotor by way of said separated liquid outlet while interrupting said discharging of separated liquid.

5. The method according to claim 1, in which the second liquid is introduced into the rotor by way of said separated liquid outlet while interrupting said discharging of separated liquid, the method also comprising interrupting said feeding of the feed liquid to said inlet immediately before said displacement of separated liquid by the second liquid, the displaced liquid and part of the second liquid being passed from the rotor through said inlet.

References Cited by the Examiner

UNITED STATES PATENTS

| | | | |
|---|---|---|---|
| 2,532,792 | 12/1950 | Svensjo | 233—19 |
| 2,955,754 | 10/1960 | Nyrop | 233—20 |
| 2,973,896 | 3/1961 | Peltzer | 233—19 |
| 3,073,516 | 1/1963 | Glasson | 233—28 |
| 3,080,108 | 3/1963 | Jacobson | 233—14 |
| 3,167,509 | 1/1965 | Steinacker | 233—20 |

M. CARY NELSON, *Primary Examiner.*